United States Patent
Yamada et al.

(10) Patent No.: US 7,924,548 B2
(45) Date of Patent: Apr. 12, 2011

(54) ELECTRIC DOUBLE LAYER CAPACITOR

(75) Inventors: Chiho Yamada, Osaka (JP); Yoshinori Takamuku, Kyoto (JP); Motohiro Sakata, Osaka (JP)

(73) Assignee: Panasonic Corporation, Osaka (JP)

( * ) Notice: Subject to any disclaimer, the term of this patent is extended or adjusted under 35 U.S.C. 154(b) by 355 days.

(21) Appl. No.: 12/159,950

(22) PCT Filed: Feb. 14, 2007

(86) PCT No.: PCT/JP2007/052628
§ 371 (c)(1),
(2), (4) Date: Jul. 2, 2008

(87) PCT Pub. No.: WO2007/094366
PCT Pub. Date: Aug. 23, 2007

(65) Prior Publication Data
US 2009/0154062 A1  Jun. 18, 2009

(30) Foreign Application Priority Data

Feb. 16, 2006  (JP) ................. 2006-039011
Feb. 24, 2006  (JP) ................. 2006-048217
Feb. 24, 2006  (JP) ................. 2006-048218
Mar. 10, 2006  (JP) ................. 2006-065382

(51) Int. Cl.
*H01G 9/00* (2006.01)
(52) U.S. Cl. ...................................... 361/502
(58) Field of Classification Search ............. 361/502
See application file for complete search history.

(56) References Cited

U.S. PATENT DOCUMENTS

| | | | | |
|---|---|---|---|---|
| 5,124,022 A * | 6/1992 | Evans et al. | ........... | 205/175 |
| 5,212,622 A * | 5/1993 | MacFarlane et al. | ....... | 361/305 |
| 5,558,954 A * | 9/1996 | Morrison | ........... | 429/231.8 |
| 6,631,074 B2 * | 10/2003 | Bendale et al. | ........... | 361/509 |
| 6,914,768 B2 * | 7/2005 | Matsumoto et al. | ...... | 361/502 |
| 7,449,031 B2 | 11/2008 | Tsunekawa et al. | | |
| 7,508,650 B1 * | 3/2009 | Bluvstein et al. | ........ | 361/502 |

FOREIGN PATENT DOCUMENTS

| | | | |
|---|---|---|---|
| CN | 1726569 A | | 1/2006 |
| JP | 01241812 A | * | 9/1989 |
| JP | 03064907 A | * | 3/1991 |
| JP | 06013266 A | * | 1/1994 |
| JP | 11130416 A | * | 5/1999 |
| JP | 2002-260966 | | 9/2002 |
| JP | 2002270470 A | | 9/2002 |
| JP | 2005-135950 | | 5/2005 |

OTHER PUBLICATIONS

South Korean Office action for Appl. No. KR 10-2008-7014549 dated Mar. 11, 2010.
International Search Report for PCT/JP2007/052628, May 11, 2007.

* cited by examiner

*Primary Examiner* — Eric Thomas
*Assistant Examiner* — David M Sinclair
(74) *Attorney, Agent, or Firm* — Pearne & Gordon LLP

(57) ABSTRACT

An electric double layer capacitor includes a positive electrode, a negative electrode which faces the positive electrode and is isolated therefrom, and an electrolyte solution. The positive electrode includes a first current collector of a metal foil and a first polarizable electrode layer on the first current collector, the first polarizable electrode layer containing a phosphorus compound. The negative electrode includes a second current collector of a metal foil and a second polarizable electrode layer on the second current collector. The electrolyte solution, with which the first and second polarizable electrode layers are impregnated, has fluorine-containing anions as an electrolyte solute.

9 Claims, 4 Drawing Sheets

ELECTRIC DOUBLE LAYER CAPACITOR

This is a U.S. national phase application of PCT international application PCT/JP2007/052628.

TECHNICAL FIELD

The present invention relates to an electric double layer capacitor used in various electronic devices, and more particularly to an electric double layer capacitor with low resistance and excellent long-term reliability.

BACKGROUND ART

An electric double layer capacitor includes a capacitor element having a pair of polarizable electrodes and a separator. Each of the polarizable electrodes includes a current collector of an aluminum foil or the like and activated carbon-based electrode layers formed on the current collector. The polarizable electrodes are wound with the separator interposed therebetween to form the capacitor element. The capacitor element is then impregnated with an electrolyte solution to form the electric double layer capacitor. In order to reduce its deterioration due to electrolysis, the electrolyte solution has an electrolyte solute dissolved therein, the electrolyte solute containing anions which contain a halogen such as fluorine. Such an electric double layer capacitor is disclosed in Patent Document 1, for example.

If the electrolyte solution generates fluorine ions, which are decomposition products of the anion, or contains fluorine ions as impurities, the fluorine ions react with the aluminum used as the current collector. This causes the formation of a passive film of aluminum fluoride between the current collector and the polarizable electrode layers. The passive film causes an increase in the interface resistance between the current collector and the polarizable electrode layers and hence the resistance of the electric double layer capacitor is increased.

Patent Document 1: Japanese Patent Unexamined Publication No. 2002-260966

SUMMARY OF THE INVENTION

The present invention is directed to provide an electric double layer capacitor which has excellent long-term reliability and is less likely to form a passive layer between the current collector and the polarizable electrode layers. The electric double layer capacitor of the present invention includes a positive electrode, a negative electrode which faces the positive electrode and is electrically isolated therefrom, and an electrolyte solution. The positive electrode includes a first current collector of a metal foil and a first polarizable electrode layer on the first current collector, the first polarizable electrode layer containing a phosphorus compound. The negative electrode includes a second current collector of a metal foil and a second polarizable electrode layer on the second current collector. The electrolyte solution, which is used to impregnate the first and second polarizable electrode layers, has fluorine-containing anions as an electrolyte solute. Thus, the first polarizable electrode layer contains a phosphorus compound, which is stable to fluorine ions, thereby stabilizing the surface of the first current collector. The phosphorus compound functions to prevent the chemical reaction between the first current collector and the fluorine ions at the interface between the first polarizable electrode layer and the first current collector. This suppresses an increase in the interface resistance.

DETAILED DESCRIPTION OF PREFERRED EMBODIMENTS

Figure 1:
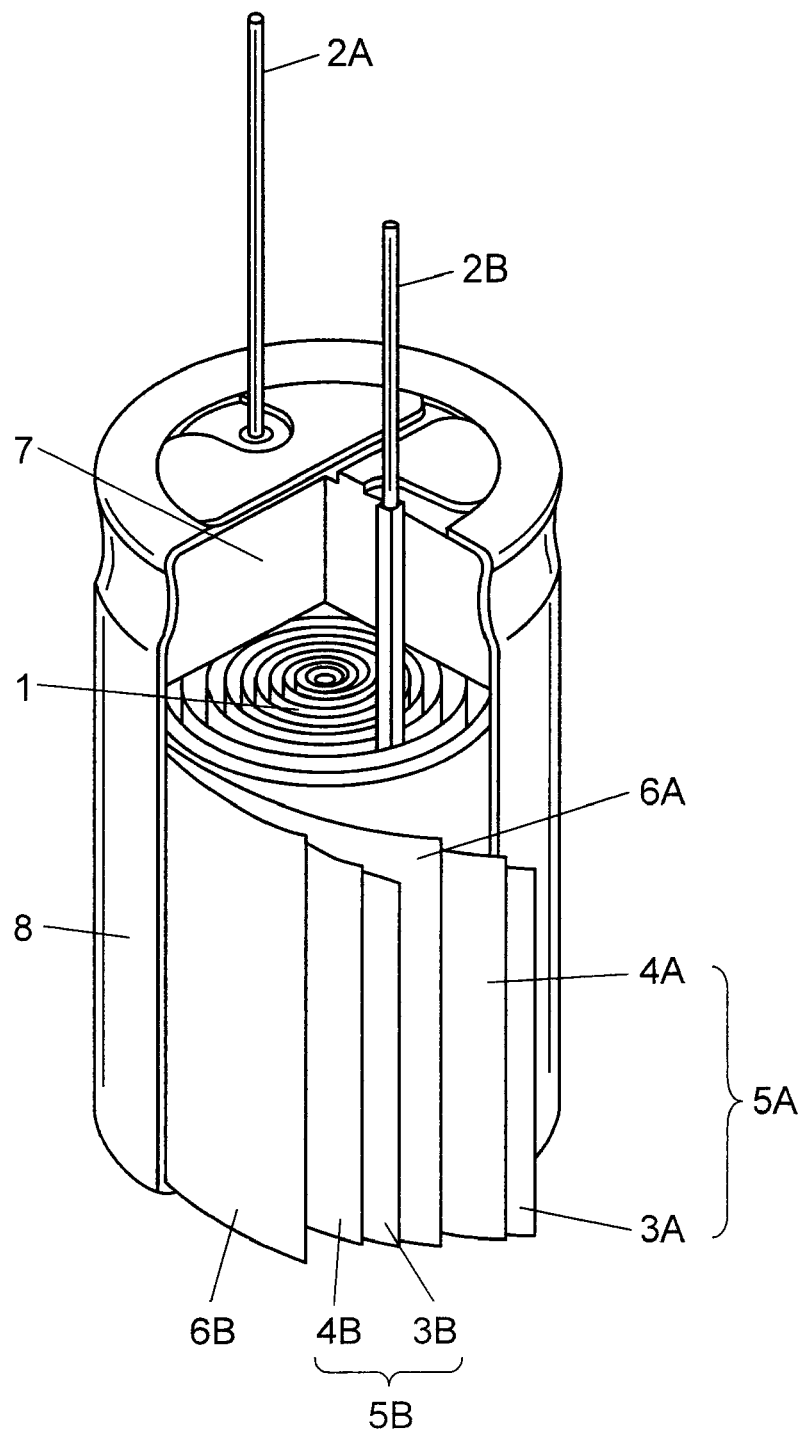
FIG. 1 is a partially cutaway perspective view of an electric double layer capacitor according to embodiments of the present invention.

Embodiments of the present invention are described as follows with reference to drawings. In these embodiments, like components are labeled with same reference numerals and not repeatedly described in detail.

First Embodiment

FIG. 1 is a partially cutaway perspective view of an electric double layer capacitor of the present embodiment. The electric double layer capacitor includes capacitor element 1, case 8 for housing capacitor element 1, sealing member 7 for sealing the opening of case 8, and an electrolyte solution (not shown) with which capacitor element 1 is impregnated. The electrolyte solution has an electrolyte solute dissolved therein, the electrolyte solute containing fluorine-containing anions.

The capacitor element 1 is formed by winding positive electrode 5A, negative electrode 5B facing positive electrode 5A, and separators 6A, 6B providing electrical isolation between positive electrode 5A and negative electrode 5B. Positive electrode 5A includes first current collector (hereinafter, current collector) 3A formed of a metal foil and first polarizable electrode layers (hereinafter, electrode layers) 4A formed on current collector 3A. Negative electrode 5B includes second current collector (hereinafter, current collector) 3B formed of a metal foil and second polarizable electrode layers (hereinafter, electrode layers) 4B formed on current collector 3B. Electrode layers 4A and 4B each contain activated carbon powder, carbon black, and a binder. Each electrode layer 4A further contains a phosphorus compound. The phosphorus compound content of each electrode layer 4A is 1 to 5 wt %, for example. The electrolyte solution is used to impregnate electrode layers 4A and 4B. Lead wires 2A and 2B are connected to current collectors 3A and 3B, respectively.

The phosphorus compound may be one of a phosphoric acid, a phosphate, a phosphate ester, and an organic polyphosphoric acid or a combination of two or more of them. Alternatively, it is possible to use activated carbons containing a large amount of phosphorous components as residues after its purification process before the formation of electrode layer 4A.

The electrolyte solute in the electrolyte solution which contains fluorine-containing anions can be tetraethylammonium tetrafluoroborate, triethylmethylammonium tetrafluoroborate, 1-methyl-3-methylimidazolium tetrafluoroborate, 1-ethyl-2,3-dimethylimidazolium tetrafluoroborate, 1,2,3-trimethylimidazolium tetrafluoroborate, 1,3-dimethylimidazolium tetrafluoroborate, or the like. A commonly used solvent is propylene carbonate.

The following is a brief description of a method for fabricating the electric double layer capacitor. First of all, an electrode paste is prepared by kneading activated carbon powder, carbon black, and a binder such as a carboxymethylcellulose ammonium salt with ion-exchanged water. The electrode paste used for positive electrode 5A is further added with a phosphorus compound. Next, each of the electrode pastes is coated on a metal foil such as an aluminum foil, dried, and if necessary, roll-pressed. These electrode precursors having electrode layers 4A and 4B on the metal foils are cut to a predetermined dimension. Next, predetermined portions of electrode layers 4A and 4B are peeled off to expose current collectors 3A and 3B, and then lead wires 2A and 2B are welded thereto, respectively. Thus, positive electrode 5A and negative electrode 5B are complete.

Next, positive electrode 5A and negative electrode 5B are wound with separators 6A and 6B interposed therebetween so as to form capacitor element 1. Capacitor element 1 is impregnated with the electrolyte solution having the electrolyte solute which contains fluorine-containing anions. Sealing member 7 made of rubber and having holes to pass lead wires 2A and 2B is fitted into the top of capacitor element 1. Finally, capacitor element 1 is housed in bottomed cylindrical case 8 of aluminum or the like, and the opening of case 8 is drawn to compress sealing member 7, thereby sealing case 8. In such a manner, the electric double layer capacitor is complete.

The phosphorus compound in electrode layer 4A is stable to fluorine ions, thereby stabilizing the surface of current collector 3A. Therefore, if the electrolyte solution contains fluorine ions, the fluorine ions are prevented from chemically reacting with current collector 3A and from forming a passive film of aluminum fluoride between current collector 3A and electrode layer 4A. This suppresses an increase in the interface resistance between current collector 3A and electrode layer 4A. As a result, the obtained electric double layer capacitor has less property degradation and excellent long-term reliability.

It is necessary that at least electrode layers 4A of positive electrode 5A contain the phosphorus compound. The reason for this is as follows. Because of being anionic, the fluorine ions react more readily with positive electrode 5A than with negative electrode 5B. Therefore, current collector 3A reacts more readily with the fluorine ions than current collector 3B does. However, electrode layers 4B of negative electrode 5B may also contain a phosphorus compound. In this case, it is possible to suppress the formation of a passive film between current collector 3B and electrode layer 4B. It is also possible to use a common precursor for positive electrode 5A and negative electrode 5B so as not to make a mistake between them during the production process. This feature is common to the other embodiments mentioned thereafter.

Figure 2:
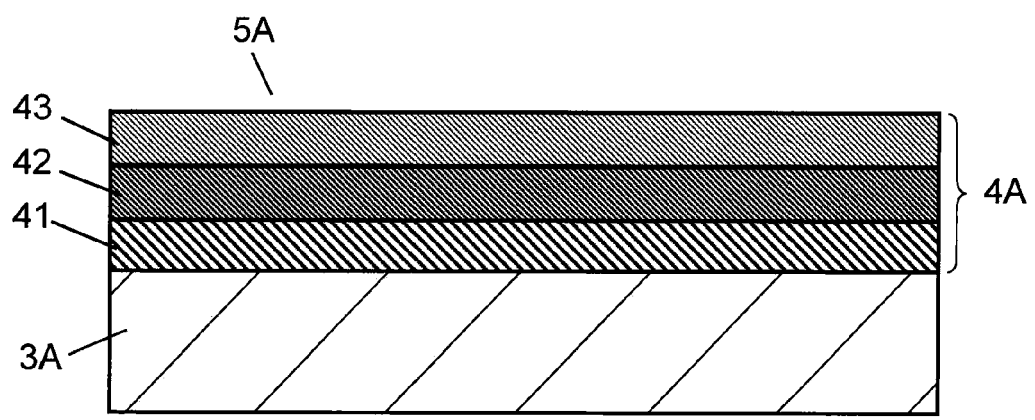
FIG. 2 is a sectional view of a positive electrode of an electric double layer capacitor according to a first embodiment of the present invention.

The following is a description of a more preferable structure of electrode layer 4A. FIG. 2 is a sectional view of the positive electrode of the electric double layer capacitor of the present embodiment. For simplification, the sectional view shows only one of electrode layers 4A at one side. Electrode layer 4A is formed of electrode layers 41, 42, and 43 having different phosphorus compound contents. Electrode layer 43 has the lowest phosphorus compound content, followed by electrode layer 42, and then electrode layers 41. In other words, these electrode layers in electrode layer 4A are laminated so that their phosphorus compound contents can be smaller as the distance from current collector 3A increases. Electrode layer 4A having this structure increases the effect of the phosphorus compound. Electrode layers 41, 42, and 43 have a phosphorus compound content of 1 to 5 wt %.

Electrode layers 41, 42, and 43 can be formed by preparing electrode pastes having different phosphorus compound contents, and then coating these pastes on current collector 3A in descending order of their phosphorus compound contents. Alternatively, one type of electrode paste containing a phosphorus compound can be coated a plurality of times and dried in different conditions from each other. In such a manner, the structure mentioned above can be made.

Electrode layers 41, 42, and 43 do not have to be laminated distinctively from each other, and can be blended with each other, for example, by being applied at the same time. In other words, the same effect can be obtained as long as the phosphorus compound content is higher in the portion close to current collector 3A than in the surface of electrode layer 4A. Electrode layer 4A of this type can be formed by coating the electrode pastes as the materials of electrode layers 41, 42, and 43 before they are well dried or by changing their roll-pressing conditions after they are dried.

The presence of the phosphorus compound in electrode layer 4A can be confirmed by detecting a phosphorous component by surface analysis using Auger electron spectroscopy or ESCA (X-ray photoelectron spectroscopy).

Second Embodiment

Figure 3:
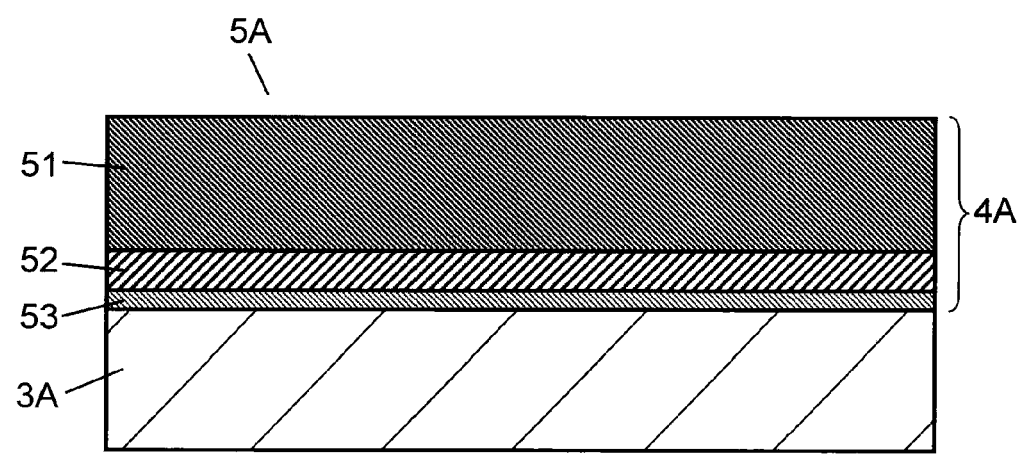
FIG. 3 is a sectional view of a positive electrode of an electric double layer capacitor according to a second embodiment of the present invention.

FIG. 3 is a sectional view of a positive electrode of an electric double layer capacitor according to a second embodiment of the present invention. The electric double layer capacitor of the present embodiment basically has the same structure as that of the first embodiment described with reference to FIG. 1. The difference is the structure of positive electrode 5A.

Positive electrode 5A includes current collector 3A formed of a metal foil such as an aluminum foil and first polarizable electrode layers 4A formed on current collector 3A. Each first polarizable electrode layer 4A includes electrode layer 51, adhesive layer 53, and anchor coat layer 52. Electrode layer 51 has the same composition as second polarizable electrode layer 4B of the first embodiment. Adhesive layer 53 is composed chiefly of a phosphorus compound and disposed on current collector 3A. Anchor coat layer 52 is disposed between adhesive layer 53 and electrode layer 51. In other words, first polarizable electrode layer 4A has adhesive layer 53 and anchor coat layer 52 disposed in this order at the interface between itself and current collector 3A.

Anchor coat layer 52 is composed of carbon black and a binder so as to improve the physical stability. The carbon black and the binder are preferably the same as those used for electrode layer 51 to improve the adhesion between anchor coat layer 52 and electrode layer 51.

The phosphorus compound composing adhesive layer 53 may be one of a phosphoric acid, a phosphate, a phosphate ester, and an organic polyphosphoric acid or a combination of two or more of them as same as the first embodiment. Adhesive layer 53 needs to be conductive because current collector 3A has a function of drawing the electric double layer capacity stored in electrode layer 51 via adhesive layer 53. In this case, the carbon contained in anchor coat layer 52 penetrates adhesive layer 53 to come into contact with current collector 3A. This provides electrical communication between electrode layer 51 and current collector 3A. Such conduction is achieved by pressing positive electrode 5A.

The following is a brief description of a method for producing positive electrode 5A. First of all, a metal foil such as an aluminum foil is soaked in an aqueous phosphate solution or a phosphate ester, or subjected to a chemical treatment. As a result, adhesive layer 53 composed of a phosphorus compound is formed on the surface of the metal foil. These approaches allow a phosphorus compound to be contained in a solution when adhesive layer 53 is formed, making it possible to control the concentration or dispersion.

Next, an anchor coating paste is prepared by kneading carbon black and a binder such as a carboxymethylcellulose ammonium salt with ion-exchanged water. The paste is coated on adhesive layer 53 formed on the metal foil and dried. Furthermore, an electrode paste is prepared by kneading activated carbon powder, carbon black, and the binder with ion-exchanged water. The paste is coated on anchor coat layer 52 formed on the metal foil and dried. The electrode precursor thus prepared is roll-pressed if necessary. The electrode precursor, which includes first polarizable electrode layers 4A each having adhesive layer 53, anchor coat layer 52, and electrode layer 51 formed in this order, is cut to a predetermined dimension. Next, predetermined portions of first polarizable electrode layers 4A are peeled off to expose current collector 3A, and then lead wire 2A is welded thereto. Thus, positive electrode 5A is complete.

In this structure, the formation of a passive film due to the fluorine ions contained in the electrolyte solution is suppressed by adhesive layer 53 of first polarizable electrode layer 4A, which is composed of a phosphorus compound. The suppression action is the same as in the first embodiment. This effect is enhanced by the provision of adhesive layer 53 on current collector 3A, thereby further reducing the interface resistance between current collector 3A and first polarizable electrode layer 4A. As a result, the obtained electric double layer capacitor has less property degradation and excellent long-term reliability.

Anchor coat layer 52 has a similar composition to electrode layer 51. Therefore, anchor coat layer 52 has a lower adhesion with current collector 3A than with electrode layer 51. In the present embodiment, however, there is provided adhesive layer 53 composed of a phosphorus compound between anchor coat layer 52 and current collector 3A. Part of the phosphorus compound in adhesive layer 53 is in the form of phosphoric acid. Therefore, oxygen atoms surrounding the phosphorus atom are slightly negatively charged. On the other hand, aluminum atom in the aluminum oxide present on current collector 3A is slightly positively charged. As a result, the oxygen atoms and aluminum atom attract each other. The phosphorus atom in the form of phosphoric acid is slightly positively charged, and the oxygen atoms in the aluminum oxide present on current collector 3A are slightly negatively charged, so that they attract each other. This increases the adhesion between anchor coat layer 52 and current collector 3A.

Furthermore, the phosphorous component in adhesive layer 53 of a phosphorus compound is hydrogen-bonded with the surface functional group of the carbon black contained in anchor coat layer 52. This chemical bonding increases the adhesion between adhesive layer 53 and anchor coat layer 52. Such physical and chemical actions reduce the interface resistance inside first polarizable electrode layer 4A and between first polarizable electrode layer 4A and current collector 3A.

The phosphorous component is preferably distributed over the entire of adhesive layer 53, but may be present in some parts of adhesive layer 53. Even in the latter case, the phosphorous component can suppress the reaction between the fluorine ions derived from the electrolyte solute and current collector 3A, thus providing the function of reducing the resistance. Adhesive layer 53 does not necessarily cover the entire surface of current collector 3A.

The presence of the phosphorus compound in adhesive layer 53 can be confirmed by detecting a phosphorous component by surface analysis using Auger electron spectroscopy or ESCA.

Third Embodiment

Figure 4:
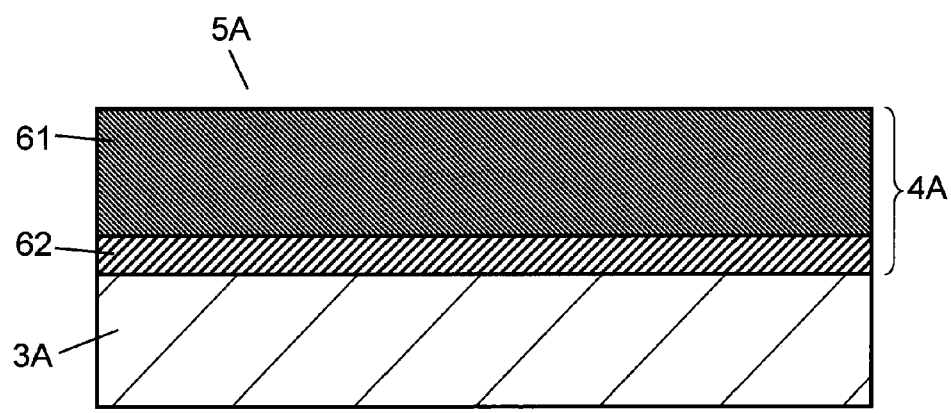
FIG. 4 is a sectional view of a positive electrode of an electric double layer capacitor according to a third embodiment of the present invention.

FIG. 4 is a sectional view of a positive electrode of an electric double layer capacitor according to a third embodiment of the present invention. The electric double layer capacitor of the present embodiment basically has the same structure as that of the first embodiment described with reference to FIG. 1. The difference is the structure of positive electrode 5A.

Positive electrode 5A includes current collector 3A formed of a metal foil such as an aluminum foil and first polarizable electrode layers 4A formed on current collector 3A. Each first polarizable electrode layer 4A includes electrode layer 61 and anchor coat layer 62. Electrode layer 61 has the same composition as second polarizable electrode layer 4B of the first embodiment. Anchor coat layer 62 is disposed between current collector 3A and electrode layer 61. In other words, first polarizable electrode layer 4A has anchor coat layer 62 at the interface between itself and current collector 3A.

Anchor coat layer 62 is composed of carbon black, a binder, and a phosphorus compound so as to improve the physical stability, thus bonding current collector 3A and electrode layer 61. The carbon black and the binder are preferably the same as those used for electrode layer 61 to improve the adhesion between anchor coat layer 62 and electrode layer 61.

The phosphorus compound contained in anchor coat layer 62 may be one of a phosphoric acid, a phosphate, a phosphate ester, and an organic polyphosphoric acid or a combination of two or more of them in the same manner as in the first embodiment. The phosphorus compound content of anchor coat layer 62 can be 1 to 5 wt %. This range allows a phosphorus compound to be contained in a solution when anchor coat layer 62 is formed, making it possible to control the concentration or dispersion.

The following is a brief description of a method for producing positive electrode 5A. First of all, an anchor coating paste is prepared by kneading carbon black, a binder such as a carboxymethylcellulose ammonium salt, and a phosphorus compound with ion-exchanged water. The electrode paste is coated on a metal foil such as an aluminum foil and dried. Furthermore, an electrode paste is prepared by kneading activated carbon powder, carbon black, and the binder with ion-exchanged water. The paste is coated on anchor coat layer 62 formed on the metal foil and dried. The electrode precursor thus prepared is roll-pressed if necessary. The electrode precursor, which includes first polarizable electrode layers 4A each having anchor coat layer 62 and electrode layer 61 formed in this order, is cut to a predetermined dimension. Next, predetermined portions of first polarizable electrode layers 4A are peeled off to expose current collector 3A, and then lead wire 2A is welded thereto. Thus, positive electrode 5A is complete.

In this structure, the formation of a passive film due to the fluorine ions contained in the electrolyte solution is suppressed by anchor coat layer 62 of first polarizable electrode layer 4A, which contains a phosphorus compound. The suppression action is the same as in the first embodiment. This effect is enhanced by the provision of anchor coat layer 62 on current collector 3A, thereby further reducing the interface resistance between current collector 3A and first polarizable electrode layer 4A. As a result, the obtained electric double layer capacitor has less property degradation and excellent long-term reliability.

Furthermore, the phosphorous component in anchor coat layer 62 is hydrogen-bonded with the surface functional group of activated carbons contained in electrode layer 61. As a result, anchor coat layer 62 and electrode layer 61 are not only physically attached but also chemically bonded to each other to increase the adhesion therebetween. On the other hand, the adhesion between anchor coat layer 62 and current collector 3A is increased by the same mechanism as in the second embodiment. This results in a reduction in the interface resistance between current collector 3A and electrode layer 61.

The phosphorus compound in anchor coat layer 62 is preferably distributed over the entire of current collector 3A. However, even if it is present only in some parts of anchor coat layer 62, the phosphorus compound can suppress the reaction between the fluorine ions derived from the electrolyte solute and current collector 3A, thus providing the function of reducing the resistance.

The phosphorus compound content of anchor coat layer 62 is preferably higher in the vicinity of current collector 3A due to the same reason as in first polarizable electrode layer 4A of the first embodiment. The presence of the phosphorus compound in anchor coat layer 62 can be confirmed by detecting a phosphorous component by surface analysis using Auger electron spectroscopy or ESCA.

Fourth Embodiment

Figure 5:
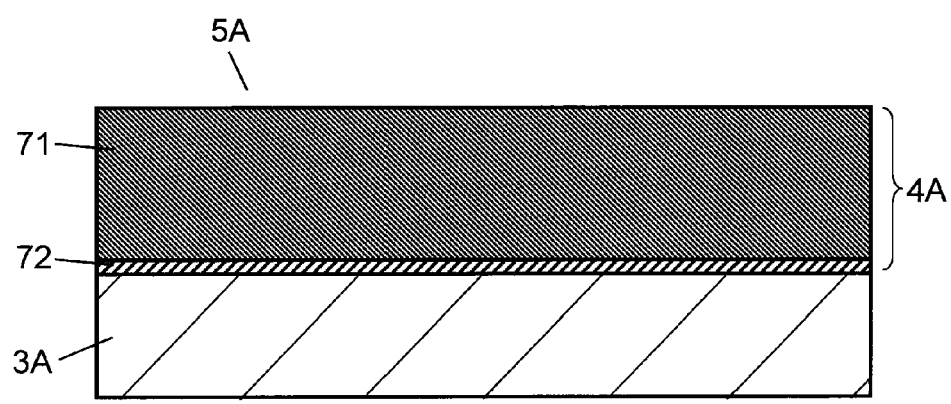
FIG. 5 is a sectional view of a positive electrode of an electric double layer capacitor according to a fourth embodiment of the present invention.

FIG. 5 is a sectional view of a positive electrode of an electric double layer capacitor according to a fourth embodiment of the present invention. The electric double layer capacitor of the present embodiment basically has the same structure as that of the first embodiment described with reference to FIG. 1. The difference is the structure of positive electrode 5A.

Positive electrode 5A includes current collector 3A formed of a metal foil such as an aluminum foil and first polarizable electrode layers 4A. Each first polarizable electrode layer 4A includes electrode layer 71 and barrier layer 72. Electrode layer 71 has the same composition as second polarizable electrode layer 4B of the first embodiment. Barrier layer 72 is composed chiefly of a phosphorus compound and disposed between current collector 3A and electrode layer 71. In other words, first polarizable electrode layer 4A has barrier layer 72 at the interface between itself and current collector 3A.

Barrier layer 72 corresponds to adhesive layer 53 in the second embodiment. Therefore, the phosphorus compound composing barrier layer 72 may be one of a phosphoric acid, a phosphate, a phosphate ester, and an organic polyphosphoric acid or a combination of two or more of them in the same manner as in the first embodiment. Barrier layer 72 can be formed in the same manner as adhesive layer 53 of the second embodiment. Electrode layer 71 can be formed in the same manner as electrode layer 61 in the third embodiment after forming barrier layer 72 on current collector 3A.

In this structure, the formation of a passive film due to the fluorine ions contained in the electrolyte solution is suppressed by barrier layer 72 of first polarizable electrode layer 4A, which is composed of a phosphorus compound. The suppression action is the same as in the first embodiment. This effect is enhanced by the provision of barrier layer 72 on current collector 3A, thereby further reducing the interface resistance between current collector 3A and first polarizable electrode layer 4A. This provides an electric double layer capacitor having less property degradation and excellent long-term reliability.

Furthermore, the phosphorus compound in barrier layer 72 on the surface of current collector 3A is hydrogen-bonded with the surface functional group of the activated carbons contained in electrode layer 71. As a result, current collector 3A and first polarizable electrode layer 4A are not only physically attached but also chemically bonded to each other to increase the adhesion therebetween. This results in a decrease in the interface resistance between current collector 3A and first polarizable electrode layer 4A.

Barrier layer 72 is preferably formed on the entire of current collector 3A. However, even if it is formed only in some parts of current collector 3A, the reaction between the fluorine ions and current collector 3A can be kept lower than in the case that barrier layer 72 is absent.

The presence of barrier layer 72 can be confirmed by detecting a phosphorous component or the like by surface analysis using Auger electron spectroscopy or ESCA.

Fifth Embodiment

Figure 6:
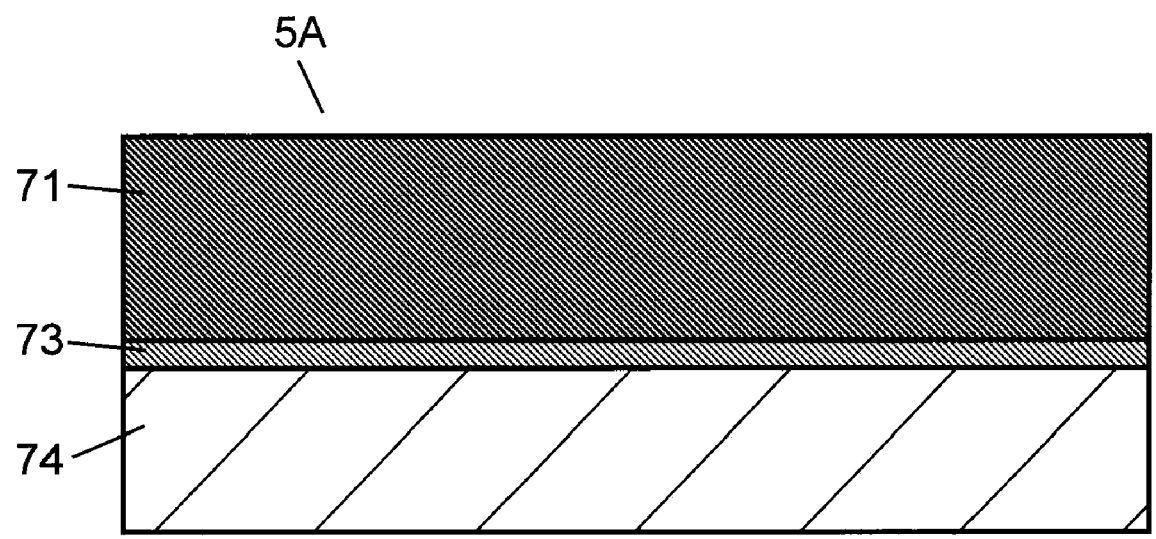
FIG. 6 is a sectional view of a positive electrode of an electric double layer capacitor according to a fifth embodiment of the present invention.

FIG. 6 is a sectional view of a positive electrode of an electric double layer capacitor according to a fifth embodiment of the present invention. The electric double layer capacitor of the present embodiment basically has the same structure as that of the first embodiment described with reference to FIG. 1. The difference is the structure of positive electrode 5A.

Positive electrode 5A includes first current collector (hereinafter, current collector) 74 formed of a metal foil such as a copper foil, barrier layer 73, and polarizable electrode layer 71. Polarizable electrode layer 71 has the same composition as second polarizable electrode layer 4B in the first embodiment. Barrier layer 73 is composed of a tantalum or niobium compound which is conductive and is disposed between current collector 74 and electrode layer 71.

The following is a brief description of a method for producing positive electrode 5A. First of all, the conductive tantalum or niobium compound is deposited on current collector 74 of copper by vapor deposition, sputtering, or the like, thereby forming barrier layer 73 on current collector 74. On the other hand, an electrode paste is prepared by kneading activated carbon powder, carbon black, and a binder such as a carboxymethylcellulose ammonium salt with ion-exchanged water. The paste is coated on barrier layer 73 formed on the metal foil and dried. The electrode precursor thus prepared is roll-pressed if necessary. The electrode precursor, which includes barrier layer 73 and polarizable electrode layer 71 formed in this order, is cut to a predetermined dimension. Next, predetermined portions of polarizable electrode layers 71 and barrier layer 73 are peeled off to expose current collector 3A, and then lead wire 2A is welded thereto. Thus, positive electrode 5A is complete.

The electrolyte solution can be an aqueous solution of sulfuric acid, potassium hydroxide, or the like instead of the non-aqueous solution used in the first to fourth embodiments. When the electrolyte solution contains corrosive ions such as sulfate ions or fluorine ions, barrier layer 73 can avoid corrosion of current collector 74. Tantalum, niobium (metal), and their compounds are chemically stable and acid-resistant. Therefore, when the electrolyte solution contains fluorine ions as anions or other corrosive ions, barrier layer 73 can prevent current collector 74 from chemically reacting with these ions. This results in suppression of the formation of highly resistive corroded products on the surface part of current collector 74 which is caused by the chemical reaction.

As a result, the interface resistance between current collector 74 and polarizable electrode layer 71 is reduced, resulting in a reduction in the chemical reactivity between current collector 74 and the electrolyte solution. This provides an electric double layer capacitor having less property degradation and excellent long-term reliability.

Barrier layer 73 may be composed of corrosive-resistant silicon, titanium, a compound thereof, or the like instead of tantalum, niobium, or a compound thereof to obtain the same effect. Current collector 74 may be made of a metal having a low specific resistance such as iron instead of aluminum or copper.

This electrode structure is preferably applied also to negative electrode 5B when the electrolyte solution contains corrosive ions as an electrolyte solute.

In FIG. 1, lead wires 2A and 2B are connected to current collectors 3A and 3B, respectively, so as to function as electrode lead-out portions. Alternatively, parts of the current collectors 3A and 3B may be used as electrode lead-out portions. This can be applied to all the embodiments.

INDUSTRIAL APPLICABILITY

The electric double layer capacitor of the present invention can suppress an increase in the interface resistance between the current collector and the polarizable electrode layers, thereby having higher reliability. This electric double layer capacitor is useful in a system requiring high reliability in high current applications used in automobiles, for example.

The invention claimed is:

1. An electric double layer capacitor comprising:
   a positive electrode including:
      a first current collector made of a metal foil; and
      a first polarizable electrode layer on the first current collector, the first polarizable electrode layer containing a phosphorus compound, wherein the first polarizable layer comprises a first phosphorus-containing region and a second phosphorus-containing region that is located a greater distance from the first current collector than the first phosphorus-containing region, and a content of the phosphorus compound in the first phosphorus-containing region is higher than a content of the phosphorus compound in the second phosphorus-containing region;
   a negative electrode facing the positive electrode and being electrically insulated therefrom, the negative electrode including:
      a second current collector made of a metal foil; and
      a second polarizable electrode layer on the second current collector; and
   an electrolyte solution having fluorine-containing anions as an electrolyte solute, the first polarizable electrode layer and the second polarizable electrode layer being impregnated with the electrolyte solution.

2. The electric double layer capacitor according to claim 1, wherein
   the phosphorus compound is at least one of phosphoric acid, a phosphate, a phosphate ester, and an organic phosphoric acid.

3. The electric double layer capacitor according to claim 1, wherein
   the second polarizable electrode layer contains a phosphorus compound.

4. The electric double layer capacitor according to claim 1, wherein
   the first polarizable electrode layer comprises an electrode layer, an adhesive layer comprising a phosphorus compound and an anchor coat layer on the adhesive layer, wherein the adhesive layer and the anchor coat layer are disposed between the electrode layer and the first current collector.

5. The electric double layer capacitor according to claim 4, wherein
   the phosphorus compound is at least one of a phosphoric acid, a phosphate, a phosphate ester, and an organic polyphosphoric acid.

6. The electric double layer capacitor according to claim 1, wherein the first polarizable electrode layer comprises an electrode layer and an anchor coat layer, wherein the anchor coat layer comprises a phosphorus compound and is disposed between the electrode layer and the first current collector.

7. The electric double layer capacitor according to claim 6, wherein
   the phosphorus compound is at least one of a phosphoric acid, a phosphate, a phosphate ester, and an organic polyphosphoric acid.

8. The electric double layer capacitor according to claim 1, wherein
   the first polarizable electrode layer comprises an electrode layer and a barrier layer, wherein the barrier layer comprises a phosphorus compound and is disposed between the electrode layer and the first current collector.

9. The electric double layer capacitor according to claim 8, wherein the phosphorus compound is at least one of a phosphoric acid, a phosphate, a phosphate ester, and an organic polyphosphoric acid.

* * * * *